United States Patent [19]
Teeslink

[11] Patent Number: 5,267,384
[45] Date of Patent: Dec. 7, 1993

[54] METHOD FOR PROVIDING A TOOLHOLDER BODY GUIDE FOR PUNCH PRESSES

[76] Inventor: John W. Teeslink, 2184 Snoqualmie Dr., Layton, Utah 84040

[21] Appl. No.: 878,611

[22] Filed: May 5, 1992

[51] Int. Cl.⁵ .............. B23P 6/02; B23P 11/02; B23Q 3/14
[52] U.S. Cl. ................ 29/402.09; 29/447; 29/559; 269/287
[58] Field of Search ............... 83/821, 698, 684, 635; 29/402.07, 402.09, 402.21, 523, 559, 447, 445, 282, 235, 88.061, 898.054; 279/2.01, 2 R, 43.3, 43.5; 148/517; 269/287, 288

[56] References Cited

U.S. PATENT DOCUMENTS

| | | | |
|---|---|---|---|
| 2,117,722 | 5/1938 | Huggins | 29/402.21 X |
| 2,308,340 | 1/1943 | Newlon | 269/287 |
| 2,720,735 | 10/1955 | Ruehl et al. | 29/559 X |
| 4,153,983 | 5/1979 | Stockton | 29/888.061 |
| 4,240,314 | 12/1980 | Teeslink | 83/635 |
| 4,555,839 | 12/1985 | Thurber | 29/235 |
| 4,573,248 | 3/1986 | Hackett | 29/447 X |
| 4,756,630 | 7/1988 | Teeslink | 384/30 |
| 4,868,367 | 9/1989 | Benway | 269/287 |
| 4,922,785 | 5/1990 | Arnold et al. | 29/523 X |
| 4,937,927 | 7/1990 | Taipale | 29/888.061 |
| 4,969,246 | 11/1990 | Shiets | 29/402.09 X |

Primary Examiner—Timothy V. Eley
Assistant Examiner—Khan V. Nguyen
Attorney, Agent, or Firm—A. Ray Osburn

[57] ABSTRACT

A toolholder guide for punch blocks, turrets, and the like, including a toolholder bore machined to accept an internal sleeve of wear resistant metal sized for reciprocal motion of the toolholder. The sleeve is installed compressed within the bore, and provides a close clearing radius with the body of the toolholder, so that the toolholder is accurately centered and guided. The inside of the sleeve is finally machined in compressed condition using a bore-simulating holding mandrel. The finally machined sleeve is shrunk for final installation into the turret bore using liquid nitrogen. The sleeve is adapted for toolholders having bodies with protruding keys or for toolholders with longitudinal keyway slots.

8 Claims, 6 Drawing Sheets

METHOD FOR PROVIDING A TOOLHOLDER BODY GUIDE FOR PUNCH PRESSES

BACKGROUND OF THE INVENTION

1. Field

The invention relates to holders for punching tools used with turrets and punch blocks, and more particularly to means for extending the usable life of the associated toolholder guides.

2. State of the Art

Repeatedly use of punch tools results in wear of the bores for guiding and positioning the toolholders, punching operations eventually becoming impractical because the toolholder is no longer sufficiently guided and centered with respect to the workpiece. The wear on the bore is typically not uniform, so that replacement of the toolholder with one of larger diameter is not practical. Restoring the guiding bore to usable condition usually requires it be re-bored, which requires replacement of the toolholder with one of appropriately larger diameter. Thus, both the bore and the toolholder must be refurbished. The resulting toolholder is of non-standard size, leading to confusion in use. Re-boring of the toolholder bore generally requires complete dismantling of the turret punch press to send the turret to another location or facility for boring. It is very desirable that some method be available to refurbish the worn bore that permits the use of the original toolholder and avoids the lost time and cost of dismantling and re-boring. Equally desirable is a toolholder guide capable of long life while being easily repaired. One method of refurbishment is disclosed in U.S. Pat. No. 4,240,314. This method involves the drilling of spaced side bores into the toolholder wall along with the insertion of plugs of resilient material into the bores to position the toolholder away from the wall. The plugs extend outwardly into the toolholder bores so that the toolholder compresses the resilient plugs tightly into the side bores. The toolholder reciprocates across the ends of the plugs. The small plugs provide limited bearing surface, and wear soon occurs requiring replacement of the plugs, although their resilient springback extends the useful life somewhat. The plastic tends to creep under constantly applied load so that the advantage of the compression is largely lost. This method is therefore of severely limited value, either for repair or for original equipment. A more desirable and practical method for refurbishment is disclosed in U.S. Pat. No. 4,756,630. With this method, the walls of the toolholder bore are broached longitudinally to provide keyways, into which are installed plastic wear strips protruding beyond the walls into the bore. The innermost surfaces of the strips are broached to a close clearing radius with the body of the toolholder so that the toolholder is accurately centered and guided for reciprocal motion within the bore. The broaching operations are carried out using a broaching fixture which secures an actuating hydraulic cylinder directly to the punch block or the turret, using adjacent toolholder bores for attachment, avoiding the necessity of dismantling the turret. This method provides a greatly improved toolholder guide capable of considerably extended life. However, the wear strips themselves eventually wear and require periodic replacement. A need therefore remains for a practical method of refurbishment of toolholder guides, especially in turret punches and punch blocks, further extending the usable life of the toolholder guides beyond the present methods.

BRIEF SUMMARY OF THE INVENTION

The foregoing disadvantages of prior art refurbished toolholder guide bores in turrets and punch blocks are substantially overcome by providing precisely dimensioned, permanently installed, bore liner sleeves of material of substantially greater hardness and wear resistance than those of the turret or punch block.

Preparatory to installation, the worn turret bore, for example, is re-sized to accommodate the sleeve, so that the original toolholder guide size is duplicated by the sleeve inside dimensions. Sized for interference fit within the enlarged bore, the sleeve, when installed, is elastically compressed circumferentially and diametrically, binding it virtually irremovably. To permit insertion within the bore, the sleeve, after final machining,, is shrunken in diameter by immersion in a bath of liquid nitrogen.

The worn bore is preferably enlarged by re-boring in place without turret disassembly, using a turret mounted fixture. The outside of the sleeve is finally machined to a diameter requiring interference fit within the enlarged turret bore, and then hardened by heat treatment. To finally machine the inside of the sleeve, it is held within a split mandrel assembly having a cavity duplicating the inside of the enlarged turret bore. In accordance with one method, the sleeve is shrunken using liquid nitrogen, placed within the mandrel, and both allowed to warm to ambient temperature. Only then is the inside of the sleeve finished machined by grinding. Alternately, the mandrel is designed to be mechanically tightened to compress the sleeve the proper amount preparatory to finish grinding of its inside surface. With either method, precise circularity of the inside of the mandrel produces the corresponding accurate circularity of the sleeve inside surface.

The finally machined sleeve is then removed by disassembly or loosening of the split mandrel and finally shrunk and assembled within the enlarged turret bore as described above, to be constrained thereby to precise roundness.

The liner sleeves are variously recessed and otherwise shaped to accommodate differing toolholder designs. One design requires a full length longitudinal keyway, so that a keyway portion must be provided by a portion of the sleeve wall. This portion is preferably attached by oven brazing. Other toolholder guide designs require a keyway slot through the sleeve wall. The sleeves must in some designs also be slotted to provide clearance for toolholder ejection springs.

Toolholder guide bores refurbished by the inventive method promise greatly improved life over original guides and those repaired by prior art methods.

It is therefore the principal object of the invention to provide toolholder guides for punch blocks or turrets wherein the wear of the walls of the toolholder bores is substantially reduced, greatly extending the life of the bore. Further objectives and advantages of the invention will be apparent from the following detailed description taken in conjunction with the accompanying drawings.

BRIEF DESCRIPTION OF THE DRAWINGS

In the drawings, which represent the best mode presently contemplated for carrying out the invention.

DETAILED DESCRIPTION OF ILLUSTRATED EMBODIMENTS

Figure 1:
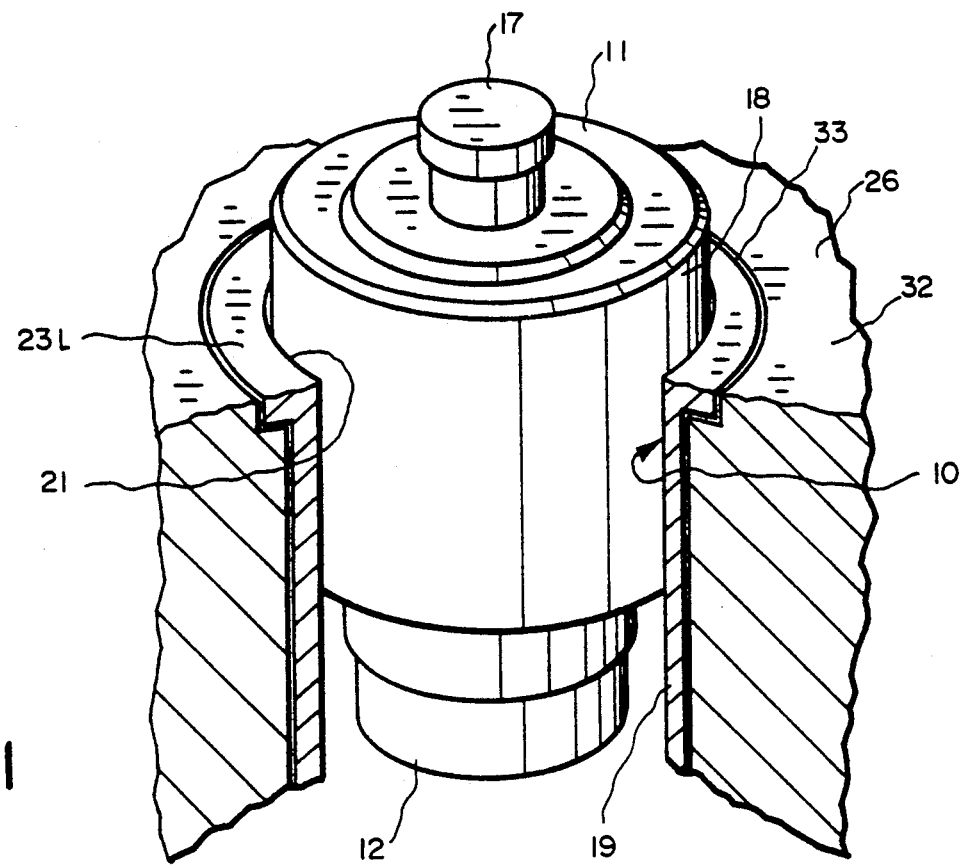
FIG. 1 is a perspective view of the toolholder guide having a toolholder body therein, partially cut away, drawn to substantially full scale, FIG. 2 a plan view of the toolholder guide with contained toolholder of FIG. 1, drawn to the same scale, FIG. 3 a vertical cross sectional view of the toolholder guide and toolholder of FIG. 2, taken along line 3—3 thereof awn to the same scale, FIG. 4 a perspective view of the sleeve of the toolholder guide of FIG. 1, drawn to approximately the same scale, FIG. 5 a cross sectional view of a toolholder guide adapted for use with an associated toolholder having a longitudinal keyway slot in its outer sleeve, drawn to the scale of FIG. 1, FIG. 6 a perspective view of a holding mandrel used for final machining of the sleeve of the toolholder of FIG. 1, drawn to a smaller scale than FIG. 1, FIG. 7 a perspective view of the turret plate of FIG. 1 in the process of re-boring, showing a boring fixture used in said operation, drawn to a reduced scale, FIG. 8 a perspective representation of the turret plate of FIG. 1 in the process of being broached to provide a slot for the keyway portion of the sleeve, drawn to a smaller scale than FIG. 1, FIG. 9 a fragmented representation of a toolholder guide in the process of manufacturer a broach, hydraulic cylinder and hydraulic piston also being shown, all drawn to substantially full scale, FIG. 10 a horizontal cross sectional view taken along line 10—10 of FIG. 9, drawn to the same scale, and FIG. 11 a perspective view of a holding mandrel of an alternate design, used for final machining of the sleeve of the toolholder of FIG. 1, drawn to a smaller scale.
Figure 2:
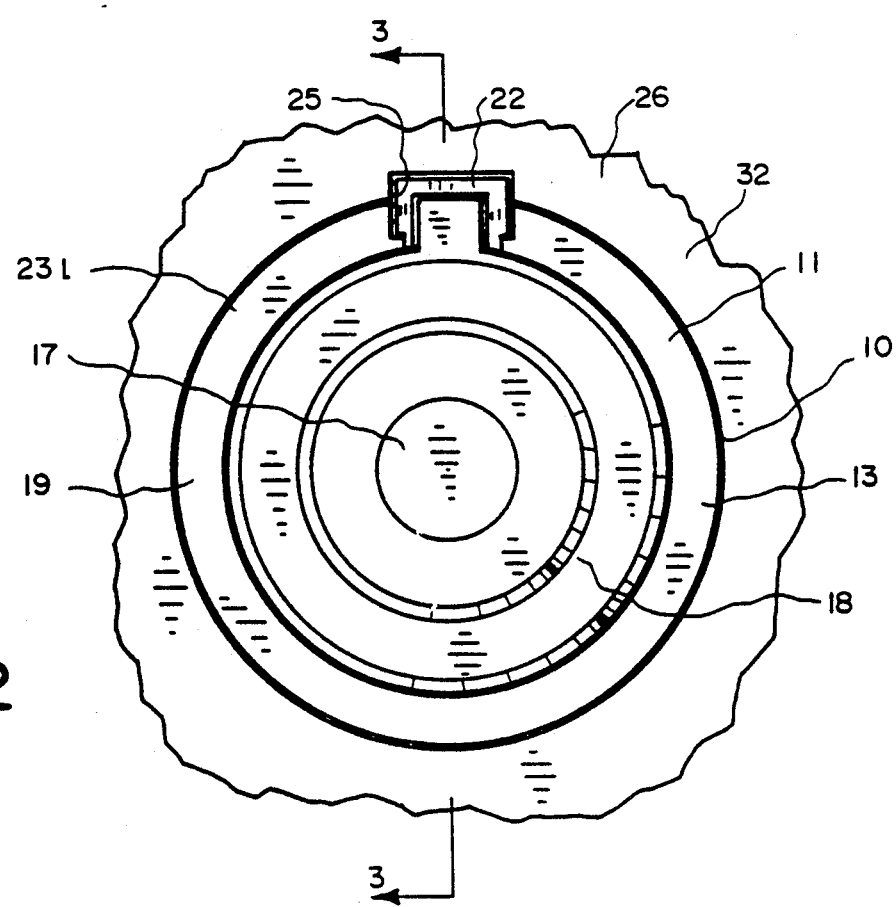
Figure 3:
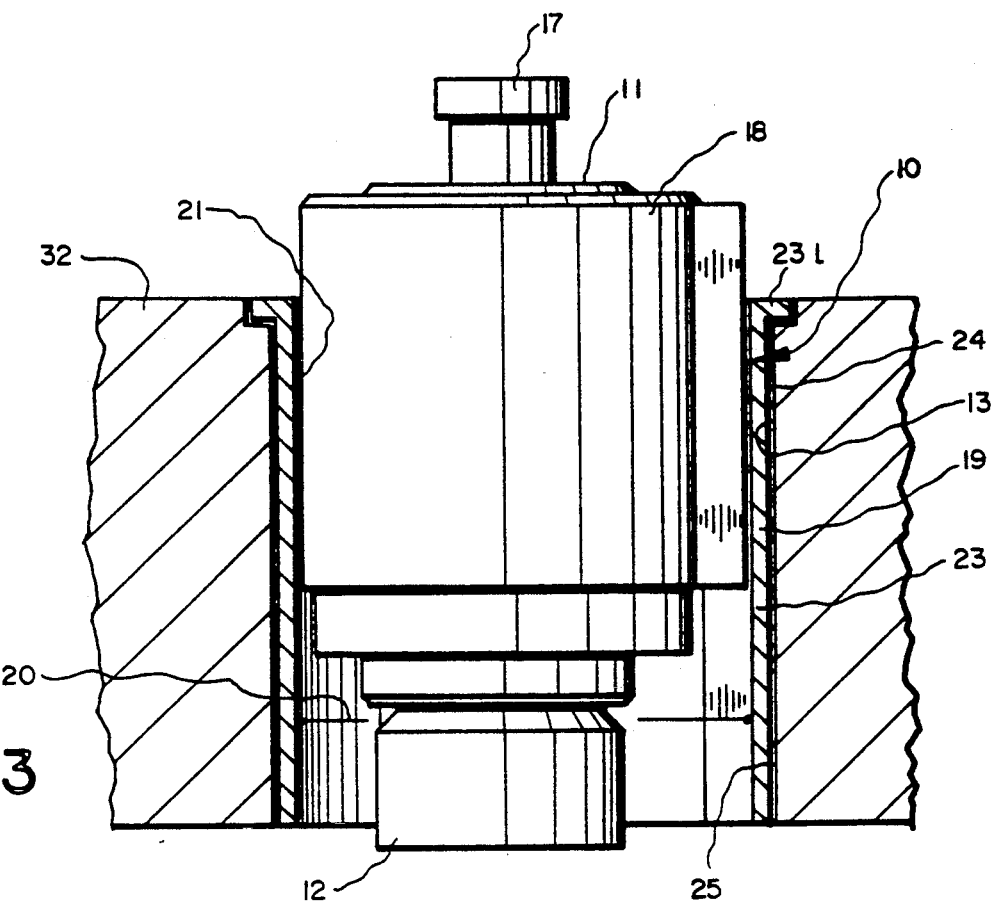
Figure 4:
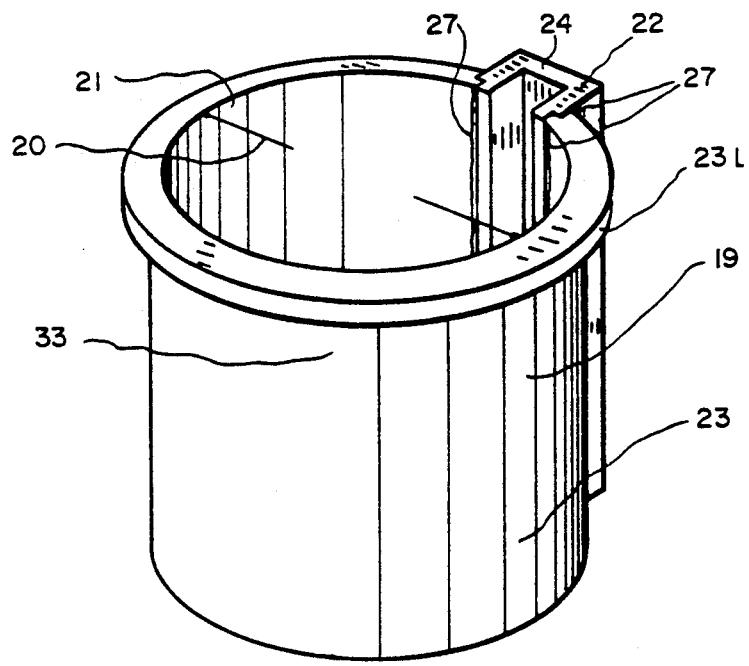
Figure 5:
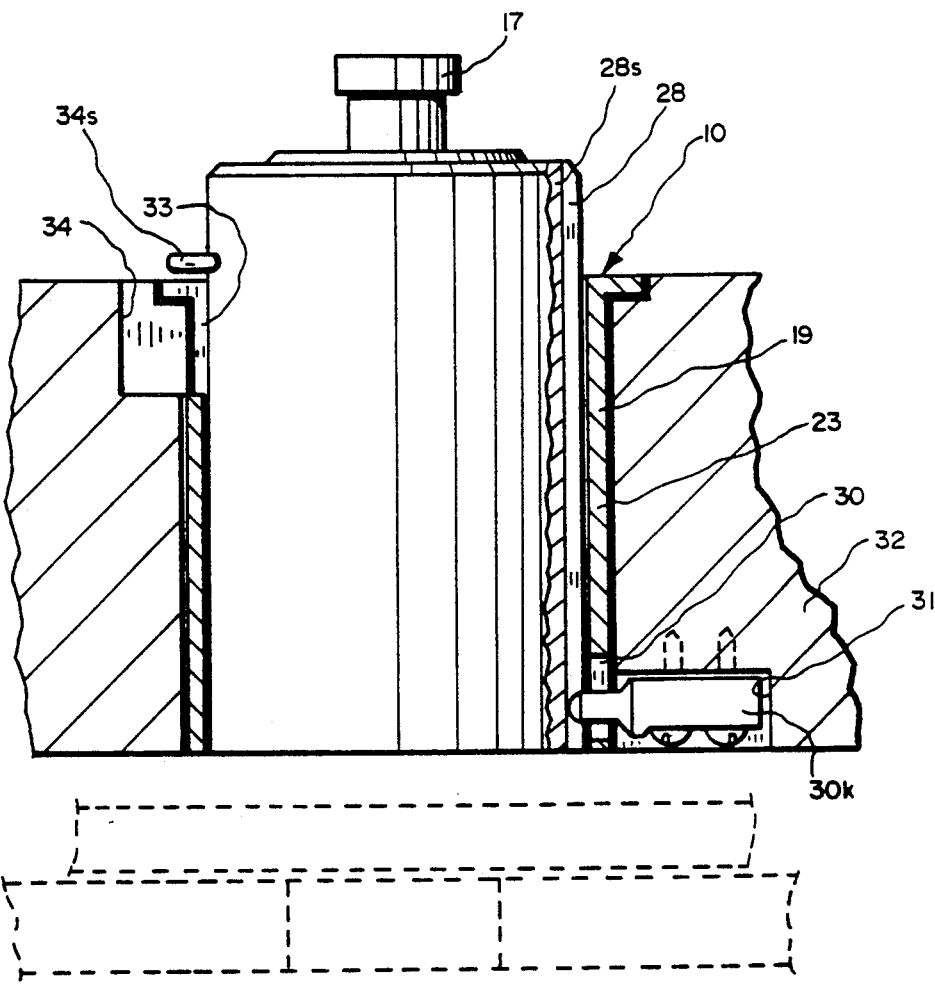

The inventive toolholder guide 10 is now described with reference to the drawings, which utilize a turret as an illustrative example. In FIGS. 1-3, a toolholder 11 with an affixed punching tool 12 is installed for reciprocating motion within a toolholder guide bore 13. Toolholder 11 is forced downwardly so that punch tool 12 strikes a workpiece 14, shown in dashed lines in FIG. 5 resting upon a die plate 15 having an appropriately sized die bore 16. Actuating force is applied to an uppermost knob 17 by means of a cam, a hydraulic piston or the like, as is common in turret and punch block work. Toolholder body 18 is guided and centered by a liner sleeve 19 installed within toolholder guide 10. The radius 20 of sleeve 19 is slightly larger than that of toolholder body 18, so that the latter may be reciprocated freely. Radial clearance of about 0.0025 to 0.005" is provided between inside surface 21 of sleeve 19 and toolholder body 18. The clearances between body 18 and the original wall of a bore before refurbishing may vary from a fraction of a thousandth of an inch to several, depending upon localized wear. Sleeve 19 is preferably constructed of a hardened steel alloy such as AISI 52100. The hardness of this material is much greater than that of the original turret, typically of cast iron. This increased hardness is expected to provide much greater toolholder guide operating life than even the toolholder guides of original equipment. It is expected that the refurbished guide may last the life of the turret.

Liner sleeve 19 is shaped and recessed as required to accommodate particular toolholder guide designs. FIGS. 1-4 illustrate a sleeve 19 modified to incorporate a full length keyway portion 22 into its wall 23. Any unprogrammed downward force is resisted by upper lip 23$l$. Keyway portion 22 is preferably provided by use of a separate, channel-shaped member 24 shaped to fit within a slot 25 broached into turret plate wall 26, attached by oven brazes 27. Other toolholder guides 13$o$ may incorporate a keyway 28 in outer sleeve 28$s$, rather than the protruding key 29. (FIG. 5) In this event, a keyway aperture 30 is provided through wall 23 of sleeve 19, in line with a key 30$k$ installed in a keyway pocket 31 provided in the body of turret plate 32. In this application, sleeve 19 must also provide clearance recesses 33 for toolholder ejection springs, not shown, which are installed into spring wells 34, and engaged by protruding pins 34$s$.

Figure 7:
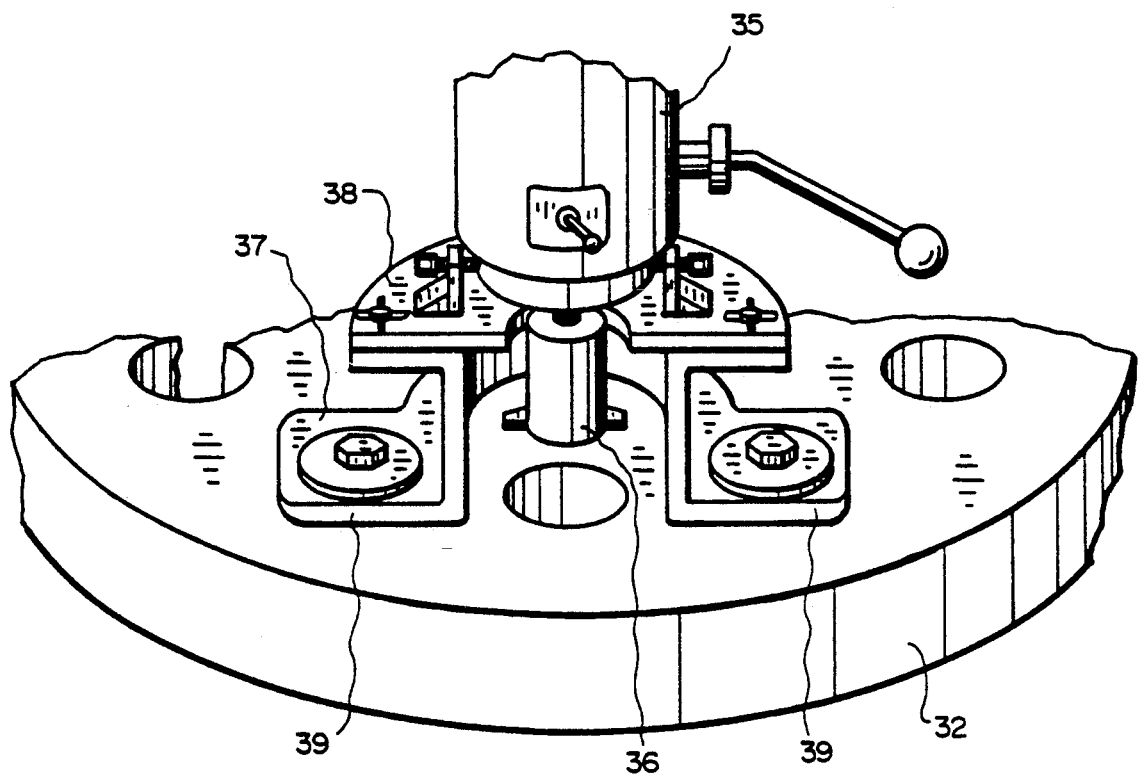

In any event, the worn guide bores must be enlarged to accommodate sleeve 19, preferably without disassembly of the turret. (FIG. 7) A vertical milling machine head 35 with a milling tool 36 may be mounted upon turret plate 32 through a riser 37 and a head support plate 38. Attaching flanges 39 secure riser 37 into adjacent guide bores in turret 32.

Figure 8:
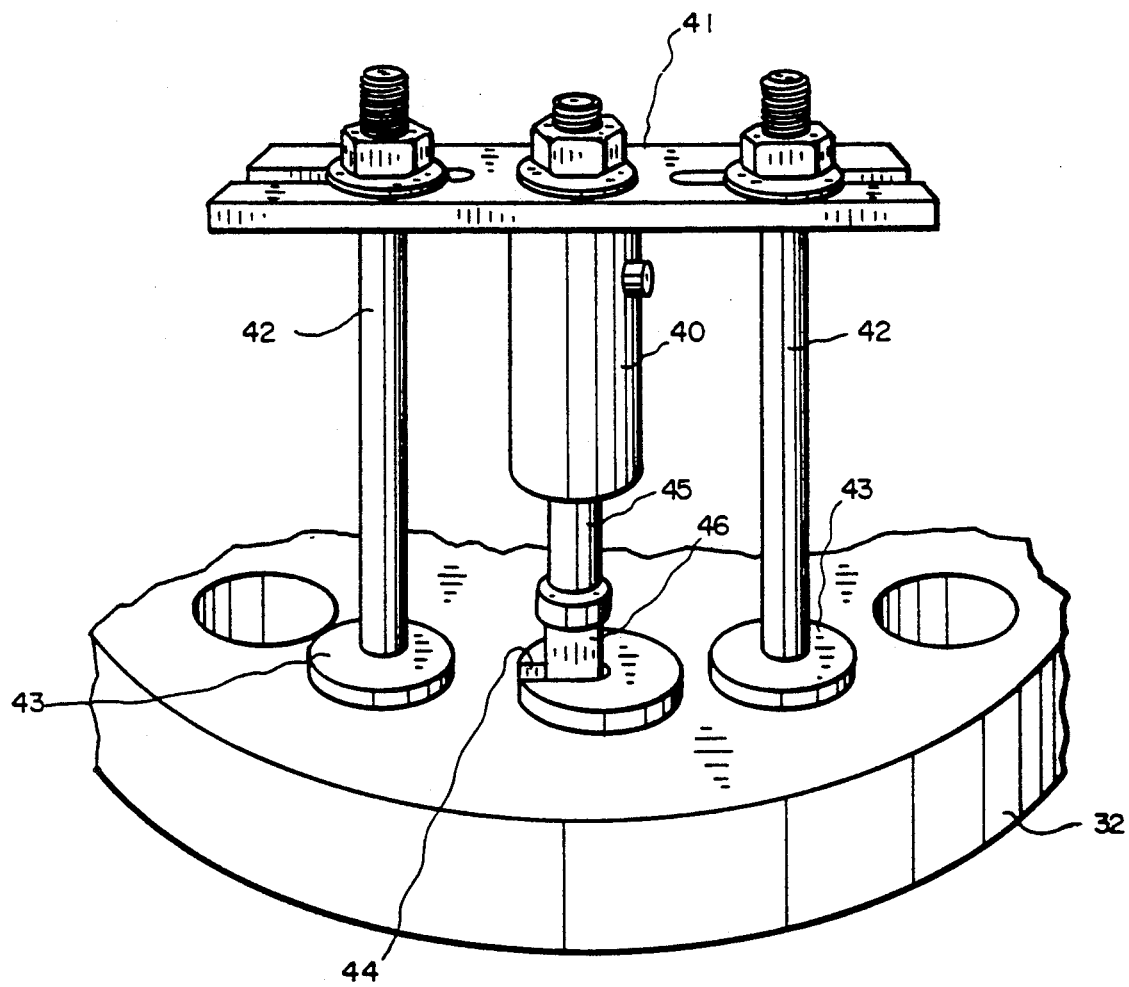
Figure 10:
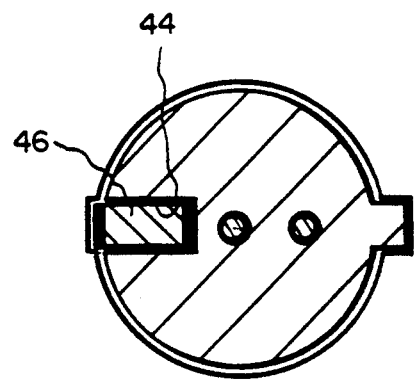
Figure 9:
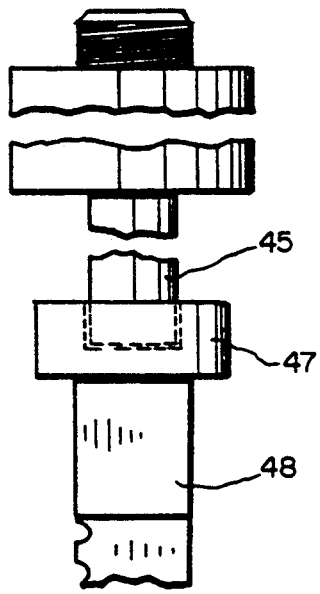
Figure 9:
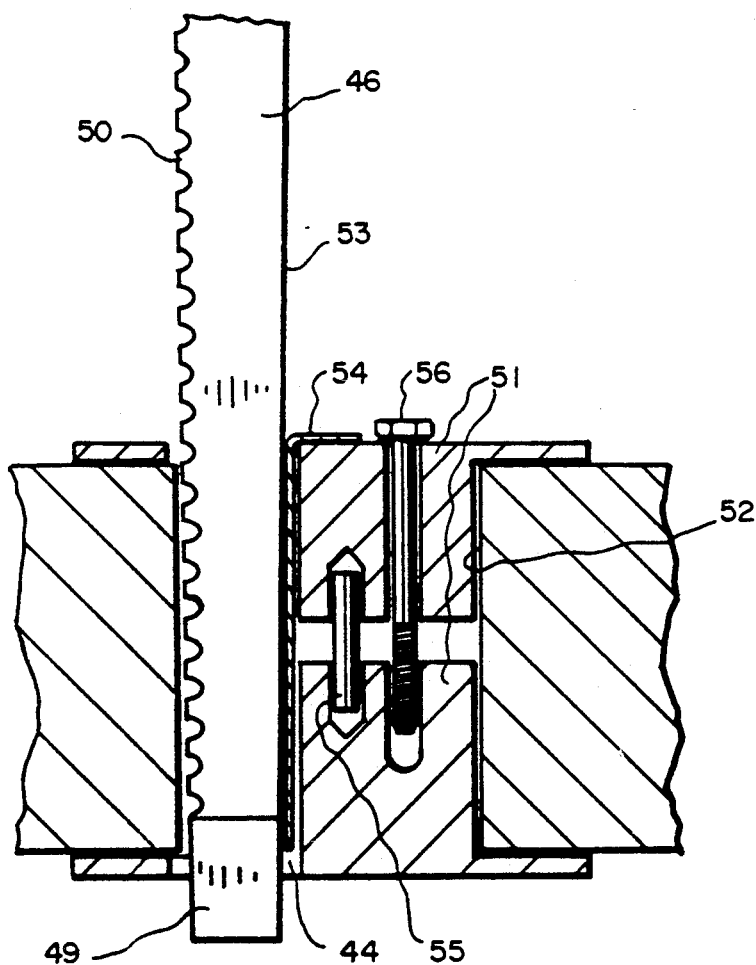

After the worn bore is enlarged to desired size, keyway slot 25 is provided using a broaching setup. (FIG. 8) The hydraulic cylinder 40 is secured to a slotted cross bar 41 supported by two threaded posts 42. Each post is secured within a nearby turret plate guide bore using internally threaded attaching flanges 43. Slots 44 permit precise positioning of cylinder 40 and piston 45 above the broaching location. Cross bar 41 and posts 42 may be moved to broach successive bores. With this setup, it is not necessary to provide any other clamps or supports, and it may be used from bore to bore from machine to machine. FIGS. 9 and 10 indicate additional details of the broaching setup, including a typical broaching tool 46, hydraulic cylinder 40 with piston 45 and broach contacting shoe 47. Broaching tool 46 bas lower and upper lead portions 48 and 49 respectively, and a toothed portion 50. A split insert 51 with a broach guide slot 44 is used within enlarged bore 52 contacting untoothed side 53. Toothed side 50, slightly tapered downwardly and inwardly, is forced against wall 26 of bore 52 as broach 46 is urged downwardly by piston 45. The removal of about 1/64" of metal during each downward stroke has proven satisfactory. Shims 54 are provided to accurately position broach 46 so that repeated cutting strokes may be made. Although insert 51 may be of one piece, it is advantageous that it have upper and lower portions, to be adaptable for varying turret plate thicknesses. Dowel pins 55 and tie bolts 56 secure the two pieces properly aligned.

Refurbishing sleeve 19 is preferably constructed from heat treatable, AISI 52100, seamless steel tubing. Other materials and other forms may prove satisfactory. For example, in some cases, longitudinally welded tubing may not be objectionable, since the weld may be in any event removed to provide a keyway. (FIG. 4) Initially, the selected steel tubing is machined to provide a cylinder with an outside diameter with an interference of 0.0005 to 0.0010" with the inside diameter of enlarged bore 52 in turret plate 32. Its inside diameter at this time may be roughly sized to a smaller than final dimension. Subsequently, for the toolholder illustrated in FIGS. 1-4, the cylinder is slotted longitudinally for a separately constructed keyway member 22, which is attached by oven brazing. The exterior dimensions of keyway member 22 are machined for close clearing fit within keyway slot 25 in enlarged turret bore 52. At this stage of construction, sleeve 19 is heat treated to 48-52 Rockwell, enhancing its wear resistance, while retaining it toughness and acquiring no brittleness.

Final machining of the inside of liner 19 after heat treating is very critical. Since close final, installed tolerances are necessary to accurately guide the toolholder body. The final machining must compensate for the diameter reduction resulting from installing the sleeve in compressed condition, and must also assure that the finally installed sleeve is precisely round. To meet these requirements, sleeve 19 is finally sized while compressed as if already installed into the turret plate bore.

Figure 6:
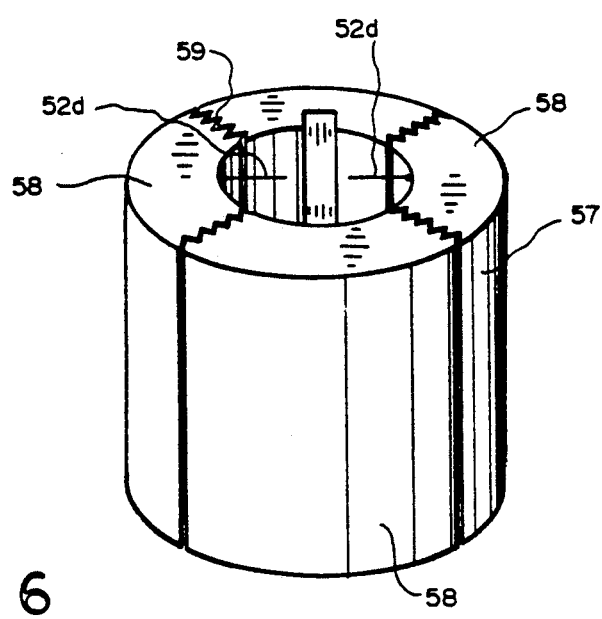

To simulate the enlarged turret plate bore 52, it is dimensionally duplicated as a precisely round bore 52d within a holding fixture, or mandrel 57, within which sleeve 19 is installed compressed for final machining at ambient temperatures. (FIG. 6) To permit removal of sleeve 19 after machining, mandrel 57 is constructed in three or four segments 58, preferably joined by matchingly serrated faces 59 and aligned by dowels, and tie bolts, neither shown. The segments may be further secured by an external circumferential band or collet, not shown.

For final machining of the inside surface of sleeve 19, it is submerged into a bath of liquid nitrogen, reducing its temperature to approximately −297° F., which shrinks it sufficiently for insertion into bore 52d of mandrel 57. Mandrel and sleeve are then permitted to warm to ambient temperatures, firmly binding the sleeve for final internal surface machining while compressed as if finally installed within turret bore 52. After final machining to a precisely round internal surface, mandrel 57 is loosened to release sleeve 19, which is again shrunk by liquid nitrogen and carefully placed into the waiting re-bored turret, wherein it warms to ambient temperature and is bound virtually permanently, held round by the turret bore.

Figure 11:
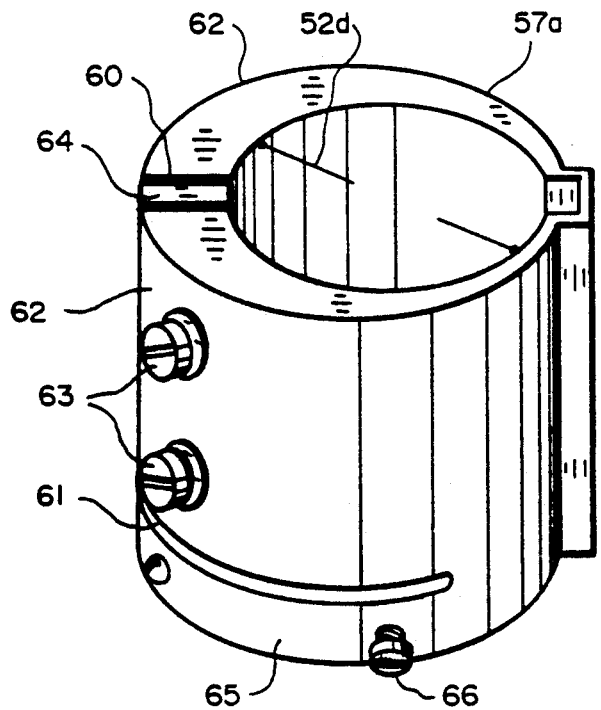

An alternate holding mandrel design 57a has an upper portion machined to the internal diameter 52d and split by a vertical slot 60 intersected by cross slot 61. (FIG. 11) For final inside machining, sleeve 19 is forcibly inserted, elastically springing the split portions 62 slightly apart. Clamping bolts 63 are then tightened, forcing the split portions into contact with a vertical spacer 64, restoring diameter 52d and compressing sleeve 19 preparatory to final machining to a precisely round inside surface. Unseparated bottom ring portion 65 is secured about the headstock, not shown, of a grinding lathe, not shown, as by radial bolts 66. Advantageously, bore 52d may be eccentric, to provide ample metal for bolts 63 and associated bores and internal threads.

Use of mandrel 57a eliminates the liquid nitrogen shrinking, and the subsequent time consuming warming period required prior to final machining of sleeve 19 using mandrel 57.

The inventive apparatus may be embodied in other specific forms, and the method in other specific steps, without departing from the spirit or essential characteristics thereof. The present apparatus and method are therefore to be considered illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. A method of providing a toolholder body guide for punch presses, including a turret punch press, said method comprising the steps:
   providing a toolholder plate having at least one bore therethrough, having a machined generally cylindrical inside surface;
   providing a steel cylindrical sleeve for lining the inside surface of the bore, having an outside and an inside cylindrical surface, the outside diameter of the sleeve being machined to a slightly larger diameter than that of the inside of the bore;
   providing a holding mandrel assembly for final machining of the inside cylindrical surface of the sleeve, said mandrel having an inside cylindrical surface machined to duplicate the diameter of the inside surface of the plate bore, said mandrel having walls comprising a pair of cantilevered elastic leaf portions secured together by releasable clamping means;
   forcibly inserting the sleeve into the mandrel and securing the leaf portions together by tightening the clamping means, compressing the sleeve and restoring the inside diameter of the mandrel to that of the plate bore;
   machining the inside surface of the sleeve to a final, toolholder-clearing, diameter, and removing the sleeve by loosening the clamping means;
   shrinking the finally machined sleeve using liquid nitrogen; and
   installing the shrunken sleeve into place within the toolholder plate bore and allowing the plate and the sleeve to stabilize at ambient temperature, so that the sleeve is installed permanently under compressive elastic diametrical and circumferential stress and strain, and so that the sleeve may receive the toolholder body for closely clearing reciprocal motion therein.

2. The method of claim 1, wherein:
   the sleeve is constructed from seamless tubing of heat treatable steel; and
   the sleeve is heat treated for increased hardness and wear resistance prior to initial shrinking and installation into the mandrel for final machining; and
   the final machining of the inside surface is by grinding.

3. A method of providing a toolholder body guide for punch presses, including a turret punch press, said method comprising the steps:
   providing a toolholder plate having at least one bore therethrough, having a machined generally cylindrical inside surface;
   providing a steel cylindrical sleeve for lining the inside surface of the bore, having an outside and an inside cylindrical surface, the outside diameter of the sleeve being machined to a slightly larger diameter than that of the inside of the bore;
   providing a rigid split mandrel assembly with an inside cylindrical surface machined to closely duplicate the diameter of the inside surface of the plate bore;
   shrinking the sleeve by immersion thereof into liquid nitrogen, inserting the shrunken sleeve into place within the mandrel assembly, and allowing the temperatures of the sleeve and mandrel to stabilize at ambient;

machining the inside surface of the sleeve to a final, toolholder-clearing, diameter, and removing the sleeve by partial or complete disassembly of the mandrel assembly;

re-shrinking the finally machined sleeve using liquid nitrogen; and installing the shrunken sleeve into place within the toolholder plate bore and allowing the plate and the sleeve to stabilize at ambient temperature, so that the sleeve is installed permanently under compressive elastic diametrical and circumferential stress and strain, and so that the sleeve may receive the toolholder body for closely clearing reciprocal motion therein.

4. The method of claim 3, wherein:

the sleeve is constructed from seamless tubing of heat treatable steel; and the sleeve is heat treated for increased hardness and wear resistance prior to initial shrinking and installation into the mandrel for final machining; and the final machining of the inside surface is by grinding.

5. A method of providing a toolholder body guide for punch presses, including a turret punch press, said method comprising the steps:

providing a toolholder plate having at least one bore therethrough, having a machined generally cylindrical inside surface with a radially outstanding groove the full length thereof;

providing a generally cylindrical steel sleeve for lining the inside surface of the bore, having an outside and an inside generally cylindrical surface, the outside diameter of the sleeve being machined to a slightly larger diameter than that of the inside of the bore, said sleeve having a wall with a radially outstanding keyway portion the full length thereof, having an outside surface machined to fit within the groove of the bore and said keyway portion having an interior surface machined to receive a key portion radially outstanding from a toolholder body;

providing a holding mandrel assembly for final machining of the inside cylindrical surface of the sleeve, said mandrel having an inside cylindrical surface machined to duplicate the diameter of the inside surface of the plate bore, said mandrel having walls comprising a pair of cantilevered elastic leaf portions secured together by releasable clamping means;

forcibly inserting the sleeve into the mandrel and securing the leaf portions together by tightening the clamping means, compressing the sleeve and restoring the inside diameter of the mandrel to that of the plate bore;

machining the inside surface of the sleeve to a final, toolholder-clearing, diameter, and removing the sleeve by loosening the clamping means;

shrinking the finally machined sleeve using liquid nitrogen; and installing the shrunken sleeve into place within the toolholder plate bore and allowing the plate and the sleeve to stabilize at ambient temperature, so that the sleeve is installed permanently under compressive elastic diametrical and circumferential stress and strain, and so that the sleeve may receive the toolholder body for closely clearing reciprocal motion therein.

6. A method of providing a toolholder body guide for punch presses, including a turret punch press, said method comprising the steps:

providing a toolholder plate having at least one bore therethrough, having a machined generally cylindrical inside surface with a radially outstanding groove the full length thereof;

providing a generally cylindrical steel sleeve for lining the inside surface of the bore, having an outside and an inside generally cylindrical surface, the outside diameter of the sleeve being machined to a slightly larger diameter than that of the inside of the bore, said sleeve having a wall with a radially outstanding keyway portion the full length thereof, having an outside surface machined to fit within the groove of the bore and said keyway portion having an interior surface machined to receive a key portion radially outstanding from a toolholder body;

providing a rigid split mandrel assembly with an inside surface machined to closely duplicate the shape and size of the inside surface of the plate bore including the full length groove thereof;

shrinking the sleeve by immersion thereof into liquid nitrogen, inserting the shrunken sleeve into plate within the mandrel assembly, and allowing the temperatures of the sleeve and mandrel to stabilize at ambient;

machining the inside surface of the sleeve to a final, toolholder-clearing, diameter, and removing the sleeve by disassembly of the mandrel assembly;

re-shrinking the finally machined sleeve using liquid nitrogen; and installing the shrunken sleeve into place within the toolholder plate bore and allowing the plate and the sleeve to stabilize at ambient temperature, so that the sleeve is installed permanently under compressive elastic diametrical and circumferential stress and strain, and so that the sleeve may receive the toolholder body for closely clearing reciprocal motion therein.

7. A method of providing a toolholder body guide for punch presses, including a turret punch press, said method comprising the steps:

providing a toolholder plate having at least one bore therethrough, having a machined generally cylindrical inside surface;

providing a generally cylindrical steel sleeve for lining the inside surface of the bore, having an outside and an inside generally cylindrical surface, the outside diameter of the sleeve being machined to a slightly larger diameter than that of the inside of the bore, said sleeve having a wall slotted for extension therethrough by a key secured to the toolholder plate to engage a keyway slot provided on the toolholder body the length thereof;

providing a holding mandrel assembly for final machining of the inside cylindrical surface of the sleeve, said mandrel having an inside cylindrical surface machined to duplicate the diameter of the inside surface of the plate bore, said mandrel having walls comprising a pair of cantilevered elastic leaf portions secured together by releasable clamping means;

forcibly inserting the sleeve into the mandrel and securing the leaf portions together by tightening the clamping means, compressing the sleeve and restoring the inside diameter of the mandrel to that of the plate bore;

machining the inside surface of the sleeve to a final, toolholder-clearing, diameter, and removing the sleeve by loosening the clamping means;

shrinking the finally machined sleeve using liquid nitrogen; and installing the shrunken sleeve into place within the toolholder plate bore and allowing the plate and the sleeve to stabilize at ambient temperature, so that the sleeve is installed permanently under compressive elastic diametrical and circumferential stress and strain, and so that the sleeve may receive the toolholder body for closely clearing reciprocal motion therein.

8. A method of providing a toolholder body guide for punch presses, including a turret punch press, said method comprising the steps:

providing a toolholder plate having at least one bore therethrough, having a machined generally cylindrical inside surface;

providing a generally cylindrical steel sleeve for lining the inside surface of the bore, having an outside and an inside generally cylindrical surface, the outside diameter of the sleeve being machined to a slightly larger diameter than that of the inside of the bore, said sleeve having a wall slotted for extension therethrough by a key secured to the toolholder plate to engage a keyway slot provided on the toolholder body the length thereof;

providing a rigid split mandrel assembly with an inside surface machined to closely duplicate the shape and size of the inside surface of the plate bore;

shrinking the sleeve by immersion thereof into liquid nitrogen, inserting the shrunken sleeve into plate within the mandrel assembly, and allowing the temperatures of the sleeve and mandrel to stabilize at ambient;

machining the inside surface of the sleeve to a final, toolholder-clearing, diameter, and removing the sleeve by disassembly of the mandrel assembly;

re-shrinking the finally machined sleeve using liquid nitrogen; and installing the shrunken sleeve into place within the toolholder plate bore and allowing the plate and the sleeve to stabilize at ambient temperature, so that the sleeve is installed permanently under compressive elastic diametrical and circumferential stress and strain, and so that the sleeve may receive the toolholder body for closely clearing reciprocal motion therein.

* * * * *